United States Patent
Purohit et al.

(10) Patent No.: US 12,347,043 B2
(45) Date of Patent: Jul. 1, 2025

(54) PROVIDING POSE INFORMATION

(71) Applicant: Google LLC, Mountain View, CA (US)

(72) Inventors: Aveek Purohit, Palo Alto, CA (US); Kan Huang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/308,510

(22) Filed: Apr. 27, 2023

(65) Prior Publication Data
US 2023/0260232 A1    Aug. 17, 2023

Related U.S. Application Data

(63) Continuation of application No. 17/248,385, filed on Jan. 22, 2021, now Pat. No. 11,670,056, which is a continuation of application No. 16/511,804, filed on Jul. 15, 2019, now Pat. No. 10,916,062.

(51) Int. Cl.
| | |
|---|---|
| *G06T 19/00* | (2011.01) |
| *G06F 3/01* | (2006.01) |
| *G06T 7/73* | (2017.01) |
| *G06V 40/16* | (2022.01) |

(52) U.S. Cl.
CPC ............ *G06T 19/006* (2013.01); *G06F 3/012* (2013.01); *G06T 7/73* (2017.01); *G06V 40/166* (2022.01); *G06V 40/169* (2022.01)

(58) Field of Classification Search
None
See application file for complete search history.

(56) References Cited

U.S. PATENT DOCUMENTS

| | | | |
|---|---|---|---|
| 4,804,139 A * | 2/1989 | Bier | F01P 7/162 236/35 |
| 10,916,062 B1 | 2/2021 | Purohit et al. | |
| 2008/0090510 A1 * | 4/2008 | Scherer | B64D 37/32 454/71 |

(Continued)

OTHER PUBLICATIONS

Extended European Search Report for European Application No. 20181322.7, mailed Nov. 26, 2020, 10 pages.

(Continued)

*Primary Examiner* — David H Chu
(74) *Attorney, Agent, or Firm* — Brake Hughes Bellermann LLP

(57) ABSTRACT

Methods, systems, and computer program products are described for obtaining, from a first tracking system, an initial three-dimensional (3D) position of an electronic device in relation to image features captured by a camera of the electronic device and obtaining, from a second tracking system, an orientation associated with the electronic device. Responsive to detecting a movement of the electronic device, obtaining, from the second tracking system, an updated orientation associated with the detected movement of the electronic device, generating and providing a query to the first tracking system, the query corresponding to at least a portion of the image features and including the updated orientation and the initial 3D position of the electronic device, generating, for a sampled number of received position changes, an updated 3D position for the electronic device and generating a 6-DoF pose using the updated 3D positions and the updated orientation for the electronic device.

20 Claims, 10 Drawing Sheets

(56) References Cited

U.S. PATENT DOCUMENTS

| | | | | |
|---|---|---|---|---|
| 2008/0095402 | A1* | 4/2008 | Kochi | G01C 11/10 |
| | | | | 382/106 |
| 2008/0199049 | A1* | 8/2008 | Daly | G09G 5/00 |
| | | | | 382/118 |
| 2008/0212870 | A1* | 9/2008 | Tan | G01C 11/00 |
| | | | | 382/154 |
| 2008/0279421 | A1* | 11/2008 | Hamza | G06T 7/285 |
| | | | | 382/103 |
| 2009/0073304 | A1* | 3/2009 | Kumagai | G03B 13/36 |
| | | | | 348/E5.042 |
| 2011/0242134 | A1* | 10/2011 | Miller | G06F 3/017 |
| | | | | 345/633 |
| 2012/0327258 | A1* | 12/2012 | Holland | G06V 40/161 |
| | | | | 348/222.1 |
| 2013/0147837 | A1* | 6/2013 | Stroila | H05K 999/99 |
| | | | | 707/705 |
| 2013/0181892 | A1 | 7/2013 | Liimatainen et al. | |
| 2015/0187137 | A1* | 7/2015 | Mullins | G06F 3/011 |
| | | | | 345/633 |
| 2016/0189391 | A1* | 6/2016 | Demartin | G08B 13/19602 |
| | | | | 382/103 |
| 2017/0011553 | A1* | 1/2017 | Chen | G02B 27/0172 |
| 2017/0270261 | A1* | 9/2017 | Contolini | G16H 40/63 |
| 2017/0358139 | A1* | 12/2017 | Balan | G02B 27/017 |
| 2018/0005034 | A1* | 1/2018 | Kaehler | G06T 7/11 |
| 2018/0005393 | A1* | 1/2018 | Senthamil | G06F 16/29 |
| 2018/0211398 | A1* | 7/2018 | Schmidt | G01S 7/4873 |
| 2018/0268565 | A1* | 9/2018 | Dolin | G06T 7/70 |
| 2018/0321894 | A1* | 11/2018 | Paulovich | G06F 3/1454 |
| 2019/0005675 | A1* | 1/2019 | Burrough | H04N 9/3179 |
| 2019/0026956 | A1* | 1/2019 | Gausebeck | G06T 19/20 |
| 2019/0080498 | A1* | 3/2019 | Horie | G06T 11/60 |
| 2019/0138183 | A1* | 5/2019 | Rosas | G06F 3/0482 |
| 2019/0191125 | A1* | 6/2019 | Fink | H04N 7/08 |
| 2019/0387168 | A1* | 12/2019 | Smith | G06F 3/013 |
| 2020/0058169 | A1* | 2/2020 | Friesenhahn | G06T 19/003 |
| 2020/0111256 | A1* | 4/2020 | Bleyer | G06F 3/011 |
| 2020/0120400 | A1* | 4/2020 | Palmer | G06V 40/28 |
| 2020/0160607 | A1* | 5/2020 | Kjallstrom | G06T 19/006 |
| 2020/0258144 | A1* | 8/2020 | Chaturvedi | G06Q 30/0633 |
| 2020/0329214 | A1* | 10/2020 | Ahn | G06F 3/017 |
| 2021/0110557 | A1* | 4/2021 | Busey | G06T 7/521 |

OTHER PUBLICATIONS

Mittlefehldt, "AR Face Tracking Tutorial for iOS: Getting Started", Kodeco, Swift 4.2, iOS 12, Xcode 10, retrieved on Feb. 21, 2024 from https://www.kodeco.com/5491-ar-face-tracking-tutorial-for-ios-getting-started, 10 pages.

Extended European Search Report for European Application No. 24176631.0, mailed Aug. 5, 2024, 12 pages.

Participant: "Learn to Make a Snapchat Lens . . . It's not as Complicated as you Think", XP093188902, retrieved on Jul. 23, 2024 from https://www.youtube.com/watch?v=9yvaMtz7YOU&t=307s&ab_channel=Participant, Mar. 25, 2019, 2 pages.

* cited by examiner

PROVIDING POSE INFORMATION

CROSS-REFERENCE TO RELATED APPLICATIONS

This application is a continuation of, and claims priority to, U.S. patent application Ser. No. 17/248,385, filed on Jan. 22, 2021, entitled "6-DOF TRACKING USING VISUAL CUES," which claims priority to U.S. patent application Ser. No. 16/511,804, filed on Jul. 15, 2019, entitled "6-DOF TRACKING USING VISUAL CUES," now U.S. Pat. No. 10,916,062, the disclosures of which are incorporated by reference herein in their entirety.

TECHNICAL FIELD

This disclosure relates to 6-DoF (Degrees of Freedom) tracking technology.

BACKGROUND

Augmented reality devices are configured to display one or more images and/or objects over a physical space to provide an augmented view of the physical space to a user. The objects in the augmented view may be tracked by tracking systems that detect and measure coordinate changes for the moving objects. Tracking moving objects in augmented reality may be difficult if a background associated with the moving object includes sparsely populated content or content that is difficult to differentiate from the object. For example, when a tracking system is directed to track a moving object and any related content in front of a featureless wall, motion may not be properly tracked and, in turn, may not be properly displayed to the user according to actual captured motion. Thus, improved systems and methods may be desired for tracking objects and content in a featureless environment surrounding particular objects.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one general aspect, a computer-implemented method includes at least one processing device and memory storing instructions that when executed cause the processing device to perform operations including obtaining, from a first tracking system, an initial three-dimensional (3D) position of an electronic device in relation to image features captured by a camera of the electronic device, and obtaining, from a second tracking system, an orientation associated with the electronic device. Responsive to detecting a movement of the electronic device, obtaining, from the second tracking system, an updated orientation associated with the detected movement of the electronic device, generating and providing a query to the first tracking system. The query may correspond to at least a portion of the image features and including the updated orientation and the initial 3D position of the electronic device.

The method may also include, responsive to detecting the movement, receiving, responsive to the query, a plurality of position changes for the portion of the image features in relation to the initial 3D position of the electronic device, generating, for a sampled number of the plurality of position changes, an updated 3D position for the electronic device, generating a 6-DoF pose using the updated 3D positions and the updated orientation for the electronic device, and providing, for display on the electronic device, a camera feed depicting movement of the image features based on the movement of the electronic device, according to the generated 6-Dof pose. Other embodiments of this aspect include corresponding computer systems, apparatus, and computer programs recorded on one or more computer storage devices, each configured to perform the actions of the methods.

Implementations may include one or more of the following features. The method where the updated 3D positions are generated using a periodic sampling of three dimensions of data for a plurality of image frames representing the position of the portion of the image features relative to the position of the electronic device. The method where the periodic sampling is performed using a threshold frame rate configured to reduce jitter in the movement of the portion of the image features depicted in the camera feed provided based on the generated 6-DoF pose. The method where providing the camera feed depicting movement of the image features based on the movement of the electronic device according to the 6-DoF pose includes providing placement of virtual objects associated with the user in the camera feed according to the 6-DoF pose each time the electronic device is moved. The method where the image features include: portions of a face of a user being captured by the camera of the electronic device, the camera being a front facing camera and in which augmented reality content associated with the user is captured by the front facing camera. The method where the first tracking system executes a facial feature tracking algorithm configured to determine 3D location changes for the image features associated with at least one selected facial feature and the second tracking system is an inertial measurement unit (IMU) installed on the electronic device. The method where combining output from the first tracking system and output from the second tracking system enables tracking and placement of augmented reality content based on the generated 6-DoF pose, and responsive to the detected movement of the electronic device.

The method may also include obtaining the updated orientation associated with the detected movement of the electronic device from the second tracking system being performed in response to determining that the first tracking system is unable to provide both the position and orientation with 6-DoF. Implementations of the described techniques may include hardware, a method or process, or computer software on a computer-accessible medium.

In another general aspect, an electronic device is described. The electronic device may include a first tracking system configured to generate a 6-DoF pose for the electronic device corresponding to image features depicted in a camera feed displayed by the electronic device. The 6-DoF pose may be generated from a determined orientation for the electronic device, and a determined position for the electronic device. The determined position may be calculated using a facial feature tracking algorithm configured to detect three-dimensional location changes for at least one selected facial feature in the image features in the camera feed displayed by the electronic device. The second tracking system may include at least one inertial measurement unit (IMU) for determining an orientation of the electronic device in three-dimensional space The electronic device may include at least one processor coupled to memory and configured to trigger the first tracking system to generate the 6-DoF pose for the electronic device if the first tracking system operates within a predefined confidence threshold, trigger the second tracking system to generate an alternate 6-DoF pose if the first tracking system failed to operate within the predefined confidence threshold. The alternate 6-DoF pose may be generated by combining the determined position from the first tracking system and the orientation of the second tracking system. The processor may further trigger, for display on the electronic device, an updated camera feed depicting movement of the image features based on the 6-DoF pose or the alternate 6-DoF pose according to the determined operation of the first tracking system with respect to the predefined confidence threshold. Other embodiments of this aspect include corresponding computer systems, apparatus, and computer programs recorded on one or more computer storage devices, each configured to perform the actions of the methods.

Implementations may include one or more of the following features. The electronic device where the determination of whether the first tracking system operates within the predefined confidence threshold is performed upon detecting movement of the electronic device. The electronic device where the facial feature tracking algorithm of the first tracking system is configured to perform, upon detecting movement of the electronic device, a determination of an updated position of the electronic device relative to the at least one facial feature, the determination of the updated position of the electronic device including performing periodic sampling of three dimensions of data of a plurality of images of the at least one facial feature to reduce jitter in the movement of the at least one facial feature upon triggering the updated camera feed for display on the electronic device. The electronic device further including at least one communication module to trigger transmission of the 6-DoF pose or the alternate 6-DoF pose to display the image features on the electronic device based on a plurality of detected movements of the electronic device. The electronic device where the 6-DoF pose and the alternate 6-DoF pose indicate a position of the electronic device relative to the at least one selected facial feature. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

Figure 1A:
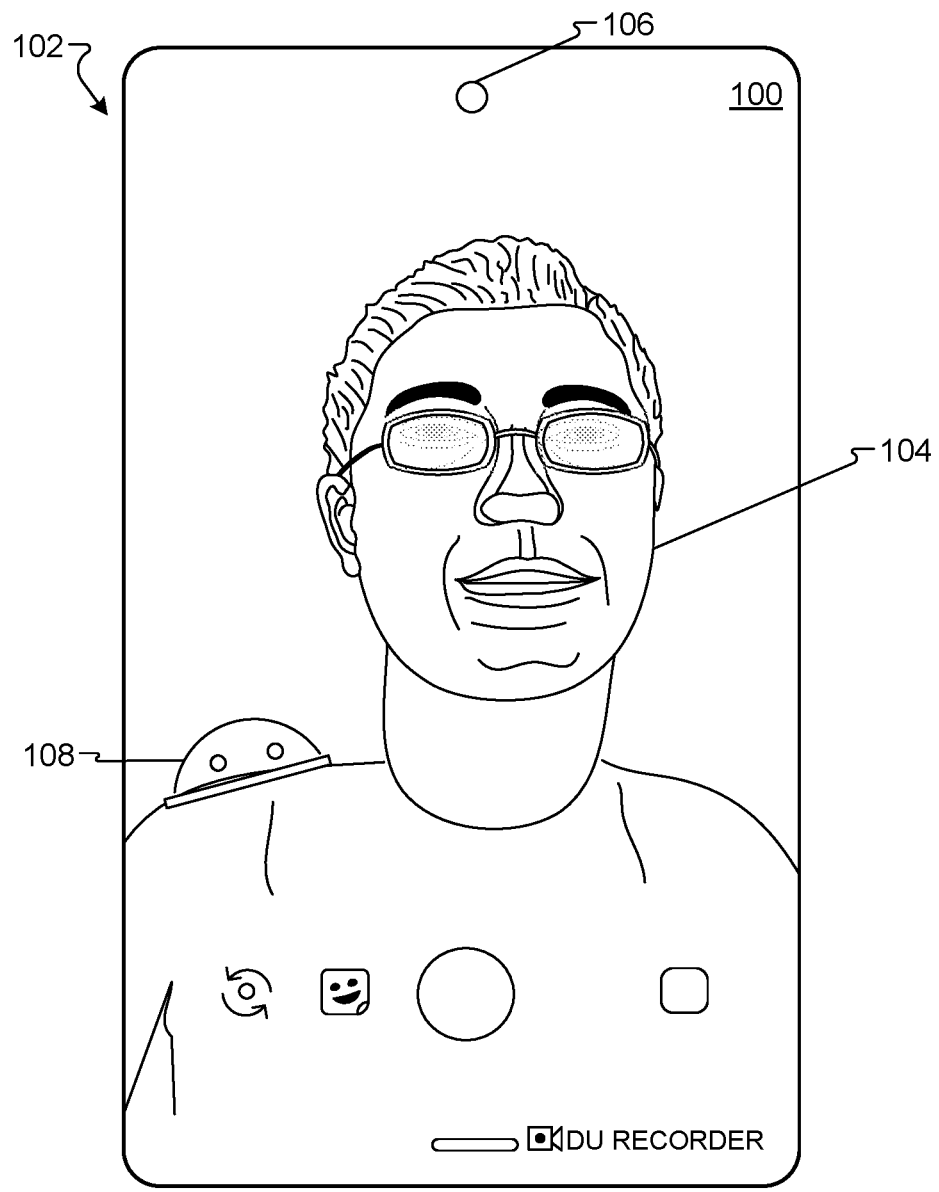
FIGS. 1A-1C depict an example of viewing and accessing augmented reality content within a scene including a user captured by a front-facing camera of a mobile device.

This document describes examples of performing six degrees-of-freedom (6-DoF) movement tracking using visual cues captured by cameras used with (or included within) computing platforms. The visual cues may include detected changes in location of facial features, for example, as a user moves in front of an electronic device (e.g., a mobile device) camera. The systems and techniques described herein may use one or more detected (and camera-captured) facial feature/image feature as an anchor point in which to track a pose of the mobile device relative to a user's face (associated with the facial features) as the mobile device moves. In particular, the systems and techniques described herein can use visual cues (e.g., facial features) to compute a relative position between a face of a user and the camera of the mobile device being operated by the user, as the device and/or the user move.

In some implementations, the systems and techniques described here may use one or more detected facial feature movement to track and place (or reposition) augmented reality (AR) or mixed reality (MR) content as the user and/or mobile device are moved. Such systems and techniques may provide an advantage of continuous movement tracking accuracy even if the camera-captured content is captured in a featureless background environment (e.g., a solid colored wall). In addition, the systems and techniques described herein may provide an advantage of continuous movement tracking accuracy when a face covers a majority of a field of view of the camera capturing the face. Additional signal smoothing and filtering may also be applied by the systems and techniques described herein to reduce video and/or image jitter in a particular camera feed being depicted on a mobile device.

In addition, the systems and techniques described herein may be used to accurately track a moving face of a user with respect to AR or MR content while properly maintaining positioning of the face and the AR or MR content as either (or both) move during capture by one or more cameras on the mobile device. The tracked movements can be used to accurately display AR and/or MR content in a user-expected location (with respect to captured content) within the camera feed. For example, the tracked movements may be used to place (and reposition) AR content and animations on or around the user at a location that the user intended to display the AR animations. Such tracked movements can be used to maintain proper placement of the animations as the user (and/or mobile device) moves and is further (and continually) captured within the camera feed.

In some implementations, the systems and techniques described herein provide feature-based motion tracking of users and content (e.g., AR/MR content, background content, etc.) captured by a front-facing mobile device camera for depiction on the mobile device. For example, poses can be determined for the mobile device with respect to all or portions of a moving face of the user captured by the mobile device camera. In particular, such poses can be calculated by determining a rotation associated with detected motion of the camera device independently from determining a translation (e.g., orientation) of the detected motion. In some implementations, the motion tracking may include use of a first algorithm to determine an orientation of the mobile device with respect to the camera-captured content (e.g., a face). The motion tracking may further include use of a second algorithm to determine a position of the mobile device with respect to the camera-captured content (e.g., the face) and/or to a physical space inhabited by the user utilizing the mobile device.

According to example implementations described throughout this disclosure, the mobile device may utilize the described algorithms to determine full 6-DoF pose data for use in tracking user movement and positioning of AR content on or near the user, as the user and/or mobile device moves. The implementations described throughout this disclosure may solve a technical problem of accurately tracking moving content being captured by a front facing camera of a mobile device during an AR experience, for example. The system may include at least two tracking systems (employing algorithms) that provide output, which may be combined to generate electronic device poses for accurately displaying user movements and AR content animations with respect to a moving user operating the electronic device. A first example tracking system may include a face tracking system that uses face cues to compute the relative position between the face (e.g., facial features) and an onboard camera. A second example tracking system may include a three degrees-of-freedom (3-DoF) tracking system based on inertial measurement unit (IMU) data obtained from the mobile device housing the front facing camera.

The technical solutions described herein may provide a technical effect of computing a rotation (e.g., orientation) and translation (e.g., in position) of motion independent of one another. The computed rotation and translation can be combined to generate a pose representing an output with six degrees of freedom.

FIG. 1A is an example depicting augmented reality content within a scene 100 including a user captured by a front-facing camera of a mobile device 102. In this example, a user 104 may be accessing a camera mode that provides software and algorithms capable of enabling the user 104 to generate and place AR and/or MR content around captured (e.g., a live and real time capture of) images of the user. For example, the user 104 may be accessing a front facing camera 106 of the mobile device 102. The user may also select or generate captions, words, animations, characters, and other AR, VR, and/or MR content. Such content may be placed within the UI depicting the camera feed from camera 106. As shown, the user 104 has added an augmented reality object depicted as a virtual character 108. As the user moves (e.g., walks, shifts, turns) and/or as the user moves the mobile device 102, the camera 106 continues to capture the user 104. The mobile device 102 may determine the changes in pose of the user as the user and/or mobile device 102 moves. For example, the mobile device 102 may determine pose changes as the user and/or device 102 is moved in three-dimensional 3D space (e.g., the x-y-z axis shown in FIG. 1B).

Figure 1B:
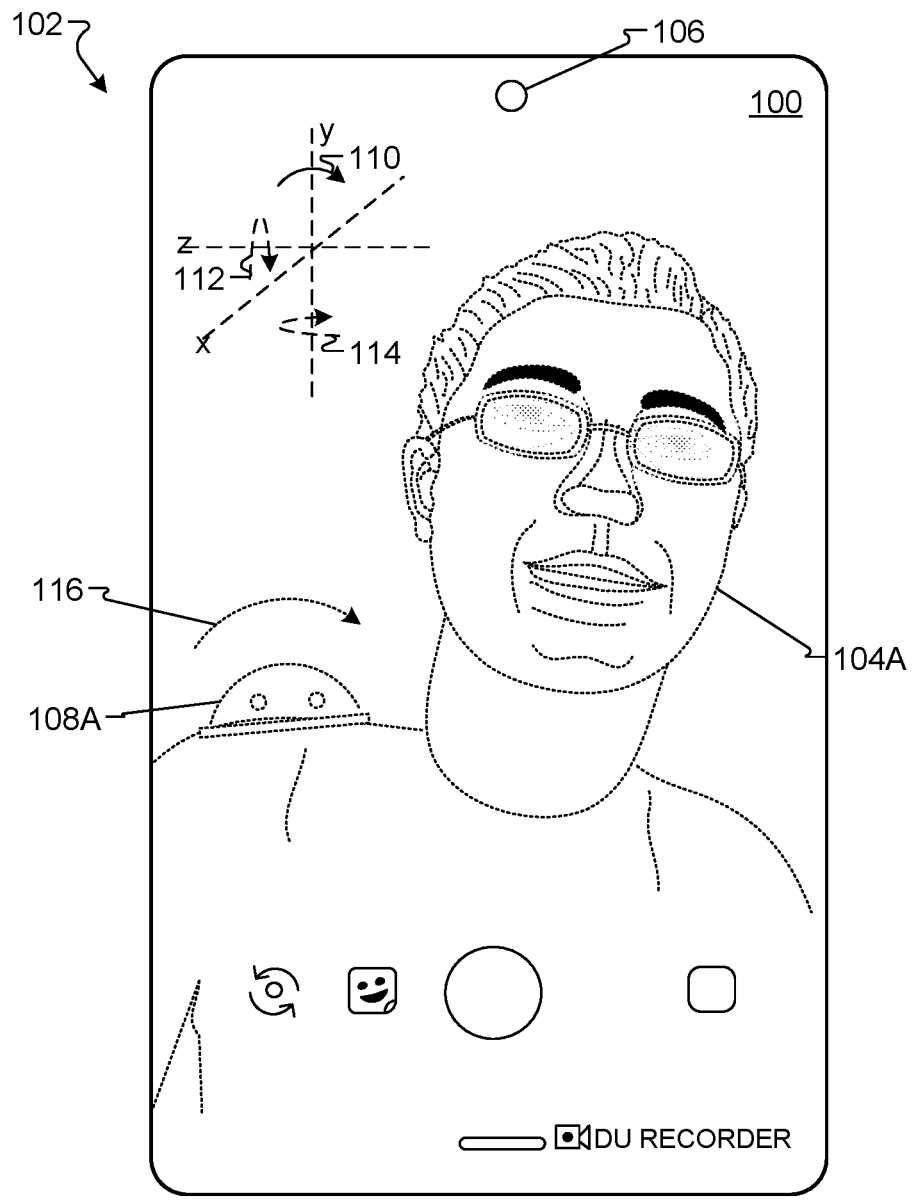

FIG. 1B is an example of an augmented reality scene 100 including a user captured by the front-facing camera of the mobile device 102. For example, the user may twist rightward (or leftward) from a perpendicular y-axis, as shown by arrow 110. Such a movement may not automatically trigger tilting of content (e.g., character 108) at any angle that the user moves when twisting and/or turning. The systems and techniques described herein may determine the pose changes of the mobile device 102 with respect to the user and/or VR or AR content in order to properly depict movements of the user and any VR and/or AR content associated with the user in the camera feed. Similarly, the systems described herein may determine pose changes associated with user or mobile device movement in a direction associated with z-axis 112 and/or x-axis 114, as shown in FIG. 1B.

In general, a position of the mobile device 102 (and/or position of the camera of the mobile device) in the physical environment may be determined by the systems described herein. The determined position of the mobile device/camera in the physical environment may, essentially, correspond to the position of the user in a physical environment. The systems described herein can use such a correspondence to determine updated positions for the mobile device and user.

The placement of the virtual object(s) (the virtual characters 108/108A) may also be known by the systems described herein. In this example, the placement position of the virtual object may be a placement position in a mixed reality scene (in some implementations, corresponding to a camera view of the physical environment) that corresponds to a physical position in the physical environment. This correspondence between the placement position of each virtual object in the mixed reality scene and a physical position in the physical environment may allow the system to detect a distance between and/or positioning and/or orientation of the mobile device (i.e., the user) relative to the virtual object(s) placed in the mixed reality scene including the physical environment. This correspondence between the placement position of each virtual object and a physical position in the physical environment may also allow the system to detect a distance between and/or relative positioning and/or relative orientation of different virtual objects placed in the mixed reality scene including the physical environment.

In some implementations, this detection and/or tracking of the positions of each of the virtual objects in the mixed reality scene of the physical environment, and detection and/or tracking of the position of the mobile device/user, may be based on respective individual three-dimensional coordinate positions of the virtual object(s) and the mobile device/user. For example, each virtual object in the mixed reality scene of the physical environment may have an associated three-dimensional coordinate position, for example, an associated (x,y,z) coordinate position. The (x,y,z) coordinate position of each virtual object in the mixed reality scene may correspond to a physical, three-dimensional (x,y,z) coordinate position in the physical environment.

Similarly, the mobile device/user may have an associated three-dimensional (x,y,z) coordinate position in the physical environment. The respective three-dimensional (x,y,z) coordinate positions of the virtual object(s) and of the mobile device/user may be intermittently updated, or substantially continuously updated, as the mixed reality scene is updated to reflect movement of the mobile device/user, movement/animation of the virtual object(s), and the like. As the detected three-dimensional (x,y,z) coordinate position(s) of the virtual object(s) and the detected three-dimensional (x,y,z) coordinate position of the mobile device/user are updated, the respective detected three-dimensional (x,y,z) coordinate positions may be used to calculate distances, and update calculated distances, between the mobile device/user and the virtual object(s) and/or between the virtual objects.

The system may combine distances calculated in this manner from a first tracking system and orientations calculated from a second tracking system to generate a pose for each particular movement of the mobile device, the user, and/or, the virtual object.

The determined movements (i.e., position changes) may be detected and used by the systems and techniques described herein to determine a 6-DoF pose that is filtered and smoothed to generate a camera feed of the user and any AR content associated with the user as the mobile device 102 is moved and changes in position and orientation occur between the mobile device 102 and the face of the user operating the mobile device 102.

In the example of FIG. 1B, the user 104A has moved (or moved the mobile device 102) to a different angle than shown in FIG. 1A. Character 108 is shown in an updated position (i.e., 108A moved in the direction of arrow 116), which corresponds to the user's movement (or mobile device movement). At a high level, the systems and techniques described herein may retrieve orientation information from an IMU associated with the mobile device 102, determine mobile device 102 position relative to the face of the user 104/104A, smooth the determined mobile device 102 position, and combine the smoothed position with the retrieved orientation to obtain updated poses (from FIG. 1A to FIG. 1B) to properly display user 104 and character 108 according to the updated poses.

Figure 1C:
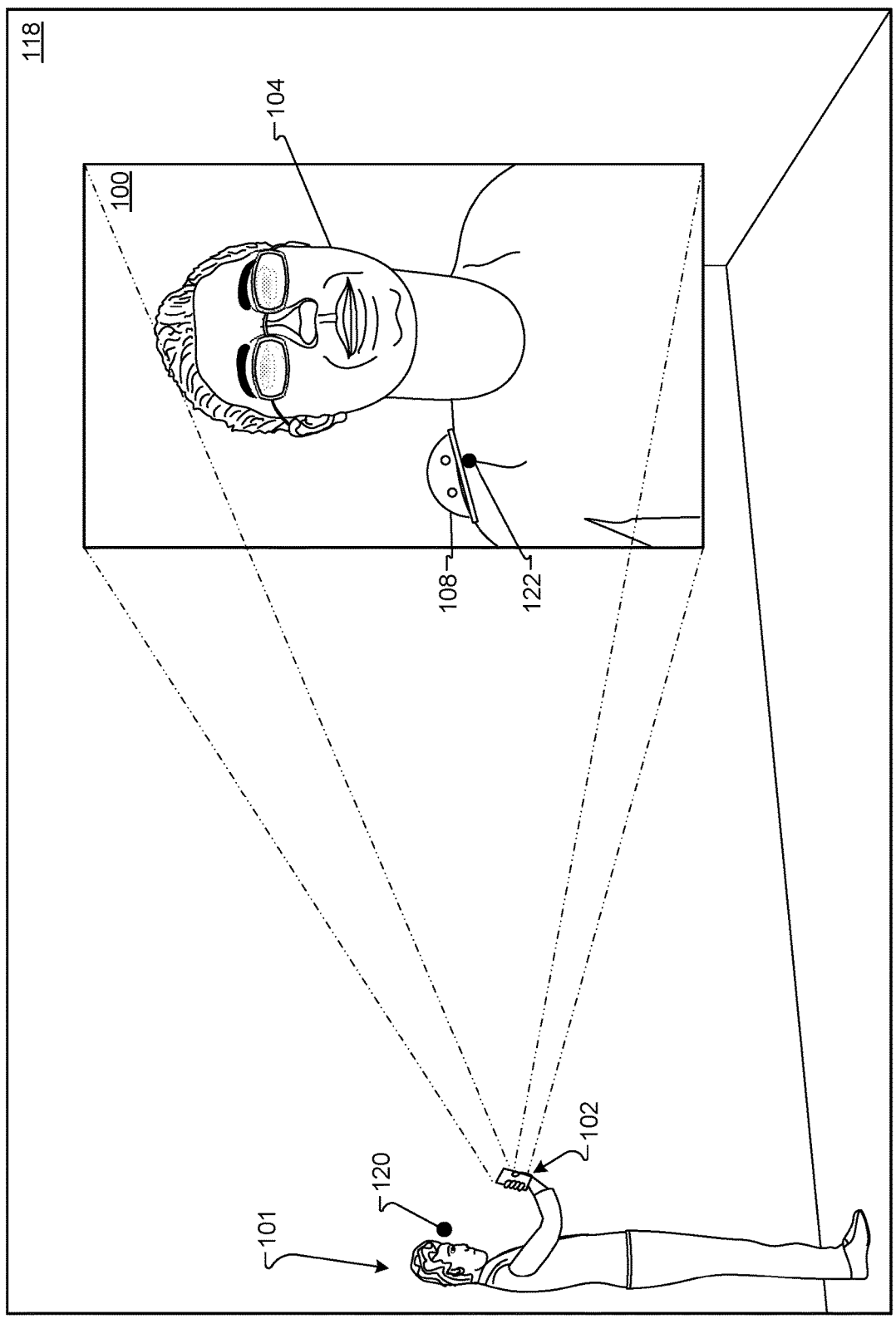

FIG. 1C is an example AR/MR scene 100 shown in a physical environment 118.

The scene 100 of the physical environment 118 is illustrated in an enlarged state, separated from the mobile device 102, simply for ease of discussion and illustration. The scene 100 may be displayed on mobile device 102. The scene 100 may represent a portion of the physical environment 118 that is captured within a field of view of the imaging device of the mobile device 102. The user is shown at a position 120.

In the example of FIG. 1C, the user may have previously placed the virtual object (e.g., character 108) in the scene 100. In the example shown in FIG. 1C, the character 108 is positioned on the shoulder of the user, at a position 122. In general, the pose of the user 104/104A may correspond to a position 120 and orientation of an imaging device, or a camera of the mobile device 102, which may be held by the user in this example. The scene 100 (for example, corresponding to a camera view of the physical environment 118) may be captured by the imaging device of the mobile device 102. The scene 100 may be displayed on, for example, a display device of the mobile device 102 or other electronic device, for viewing by the user.

Figure 2:
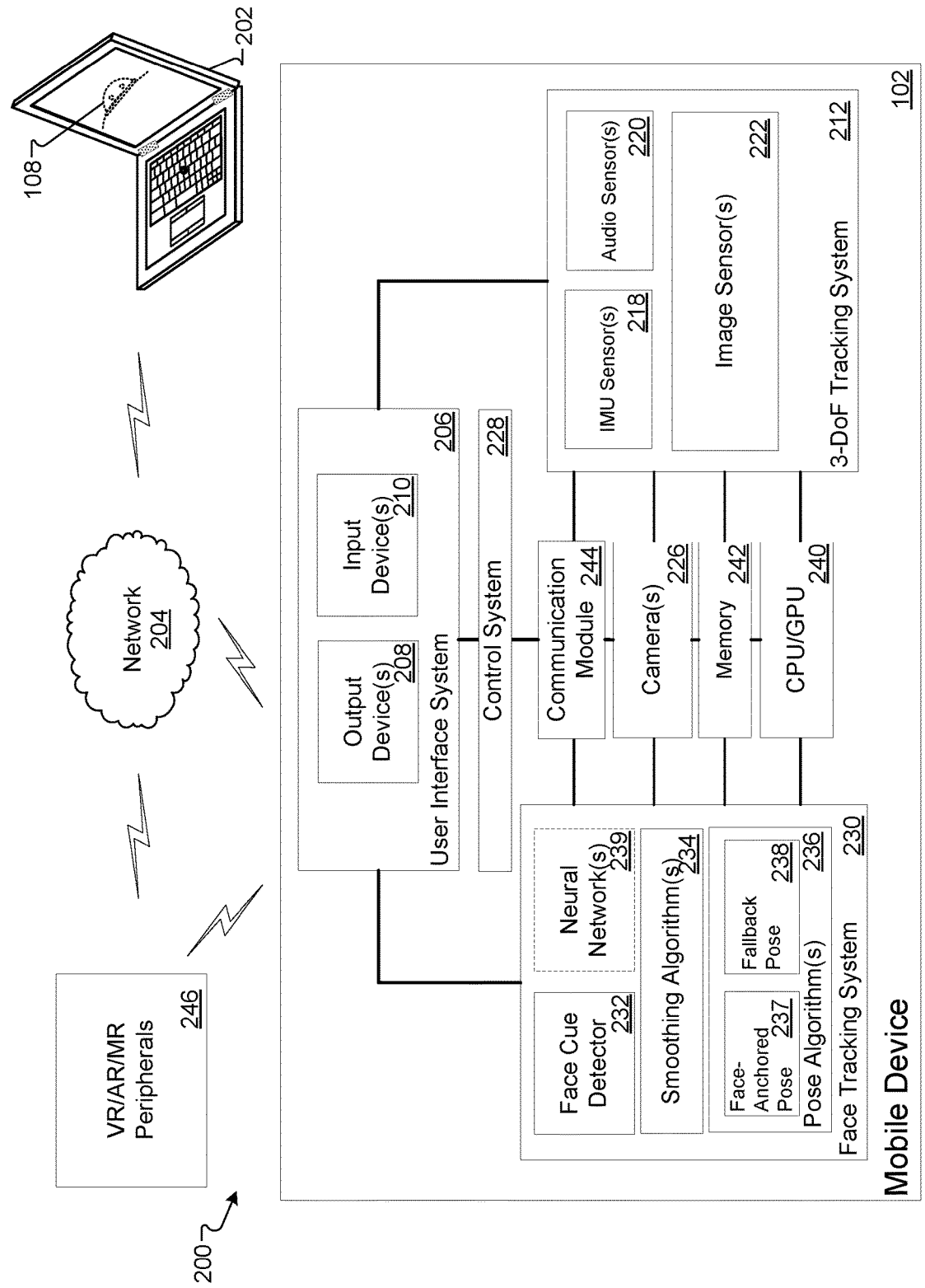
FIG. 2 is a block diagram of an example pose tracking system, in accordance with implementations described herein.

FIG. 2 is a block diagram of an example pose tracking system 200, in accordance with implementations described herein. The system 200 may be used to ascertain 3D position and 3D orientation (i.e., 6-DoF tracking) of an electronic device. As used herein, a pose may refer to a position, an orientation, or both. In addition, the system 200 may be used to perform face-anchored pose tracking (i.e., visual cues on the face) with respect to an electronic device (e.g., mobile device 102). The pose tracking system 200 may provide pose tracking for the mobile device 102 with respect to users moving and operating device 102, for example, while accessing VR, AR, and/or MR content in world space.

As used herein, the term "world space" refers to a physical space that a user inhabits. The systems and techniques described herein may utilize world space to generate and track a correspondence between the physical space and a virtual space in which visual content (e.g., AR content, MR content, etc.) is modeled and displayed. In general, a world space coordinate system may be used to track the device being operated by the user. An application may be executing on a mobile device to display user interface content generated by a user interface system 206, for example. Such an application may display the user interface content together with a live camera feed (e.g., images) to enable the user to experience AR/MR content, for example.

The mobile device 102 is an example electronic device that can generate an augmented reality (or mixed reality) environment and provide face-anchored pose tracking. The mobile device may be used in world space by a user accessing content (e.g., virtual character 108) provided from a computing device 202 (e.g., server) over a network 204, for example. Accessing content with the mobile device 102 may include generating, modifying, moving and/or selecting VR, AR, and/or MR content from computing device 202, from a local memory on mobile device 102, or from another device (not shown) connected to or having access to network 204.

As shown in FIG. 2, the mobile device 102 includes the user interface system 206. The user interface system 206 includes at least an output device 208 and an input device 210. The output device 208 may include, for example, a display for visual output, a speaker for audio output, and the like. The input device 210 may include, for example, a touch input device that can receive tactile user inputs, a microphone that can receive audible user inputs, and the like.

The mobile device 102 may also include any number of sensors and/or devices. For example, the mobile device 102 includes a 3-DoF tracking system 212. The system 212 may include (or have access to), for example, light sensors, inertial measurement unit (IMU) sensors 218, audio sensors 220, image sensors 222, relative position sensors 224, cameras 226, distance/proximity sensors (not shown), positional sensors (not shown), and/or other sensors and/or different combination(s) of sensors. Some of the sensors included in the system 212 may provide for positional detection and tracking of the mobile device 102. Some of the sensors of system 212 may provide for the capture of images of the physical environment for display on a component of the user interface system 206.

The IMU sensor 218 may function to detect, for the mobile device 102, a 3D orientation in 3D space based on the measurements taken by the IMU sensor 218. The IMU sensor 218 may include one or more accelerometers, gyroscopes, magnetometers, and other such sensors. In general, the IMU sensor 218 may detect motion, movement, velocity, and/or acceleration of the mobile device 102, for example. In some implementations, a pose of the mobile device 102, for example, may be detected based on data provided by the IMU sensor 218. Based on the detected pose, the system 200 may update content depicted in the screen of mobile device 102 to reflect a changed pose of the mobile device 102 as the device 102 is moved, for example.

The image sensors 222 may detect changes in background data associated with a camera capture. The cameras 226 may include a rear-facing capture mode and a front-facing capture mode. The front-facing capture mode may capture the user including any background scenery. The system 200 may be used to detect pose changes as the user moves with mobile device 102 and to properly depict augmented reality content in a location corresponding to the pose changes.

The mobile device 102 may also include a control system 228. The control system 228 may include, for example, a power control device, audio and video control devices, an optical control device, and/or other such devices and/or different combination(s) of devices.

The mobile device 102 may also include a face tracking system 230. System 230 may include (or have access to) one or more face cue detectors 232, smoothing algorithms 234, pose algorithms 236 including but not limited to face-anchored pose algorithm 237 and fallback pose algorithm 238, and/or neural networks 239. The face cue detectors 232 may operate on or with one or more cameras 226 to determine a movement in the position of particular facial features. For example, the face cue detector 232 (in the face tracking system 230) may detect or obtain an initial three-dimensional (3D) position of mobile device 102 in relation to facial features (e.g., image features) captured by the one or more cameras 226. For example, one or more cameras 226 may function with system 230 to retrieve particular positions of mobile device 102 with respect to the facial features captured by cameras 226. Any number of neural networks 239, smoothing algorithms 234, pose algorithms 236, and captured images may be used to determine such a position of device 102. In addition, the 3-DoF tracking system 212 may access an onboard IMU sensor 218 (i.e., an IMU) to detect or obtain an initial orientation associated with the mobile device 102.

Figure 4A:
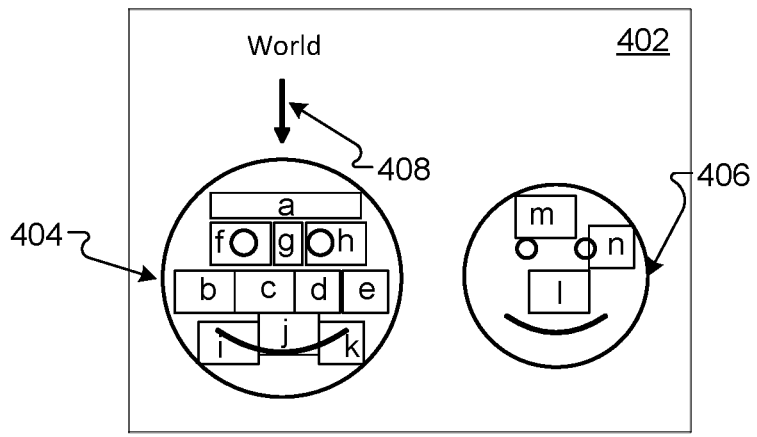
FIGS. 4A-4C are block diagrams depicting examples of selecting an object of focus for performing pose tracking, in accordance with implementations described herein.
Figure 4B:
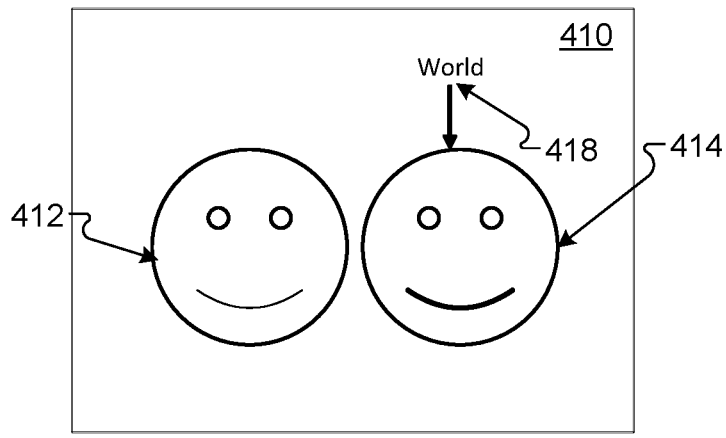
Figure 4C:
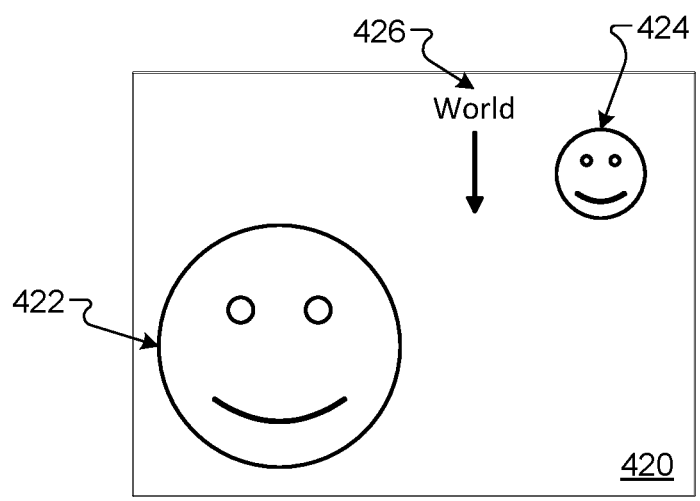

In some implementations, the face cue detector 232 may indicate to the system 200 which face to focus upon when determining 6-DoF poses from the images in the camera feed, as described in further detail in FIGS. 4A-4C.

If system 200 (e.g., mobile device 102) detects movement of the device 102, the system 200 may determine or obtain, from the 3-DoF tracking system 212, an updated orientation associated with the detected movement of the mobile device. In addition, and responsive to the same detected movement of the mobile device 102, the system 200 may generate and provide a query to the face tracking system 230. The query may correspond to at least a portion of the image features (e.g., facial features) to determine a change of position of such features. The query may include the determined updated orientation (from the IMU sensor 218 on 3-DoF tracking system 212) as well as the initial 3D position of the mobile device 102. The initial 3D position of the mobile device 102 may be sent in the query to function as an indicator that the device is static in movement, and this, the system 200 can use the face tracking system 230 to assess a transition that represents a position change of the face (e.g., facial features) relative to the mobile device 102.

In response to the query, the system 200 may receive a number of position changes for a portion of the image features in relation to the initial 3D position of the mobile device 102. The position changes may represent position changes of the mobile device 102 relative to the anchored face in world space. The face may be anchored based on the query the initial position of the mobile device.

Upon receiving the position changes, the system 200 may perform smoothing using one or more smoothing algorithms 234, as described in detail below, to generate, for a sampled number of the plurality of position changes, an updated 3D position for the mobile device 102. The updated 3D positions and the updated orientation may be used by system 200 to generate a 6-DoF pose for the moved mobile device 102 with respect to the portion of image features/facial features. The generated 6-DoF pose can be used by system 200 to provide, for display on the mobile device 102, a camera feed depicting movement of the portion of image features based on the movement of the mobile device 102. In addition, the algorithms described herein can provide placement of virtual objects associated with the user in the camera feed according to the 6-DoF pose each time the electronic device is moved.

The smoothing algorithms 234 may perform filtering, frame sampling, and other signal smoothing operations to reduce jitter in moving users and/or to predict positions of the mobile device 102 with respect to a user that is moving. In an example implementation, a position smoothing algorithm 234 may include calculating a smoothed position by assigning a position_smooth variable to represent a smoothed position viewed in the camera feed of the front facing camera of mobile device 102, as the user walks/moves with the camera capturing the face of the user. A position_best variable may be used to represent a position returned from a full 6-DoF position and orientation (i.e., pose) received from the face tracking system 230. However, if the 6-DoF element provided by face tracking system 230 is unavailable at a rate that provides smooth display of user movement and AR/MR content tracking with respect to moving user, the position_best may not be available or fully accurate each time it is queried from system 230. Thus, the smoothing algorithm 234 may update the position_smooth variable by performing a periodic sampling in three dimensions of data (e.g., x, y, z) for a number of image frames (e.g., two to five image frames, three to six image frames, four to eight image frames, and the like). The number of image frames may represent the position of a portion of image features/facial features relative to the position of the mobile device 102. In some implementations, the periodic sampling is performed using a threshold frame speed to reduce jitter in the movement of a portion of the image features/facial features depicted in the camera feed of camera 226, for example. An example frame speed may be a maximum frame speed for the calculations to ensure that a large position jump is not experienced in the user movements depicted within the camera feed.

To perform the period sampling and determine the position_smooth variables, the system 200 may use the following three equations:

$$\text{position\_smooth\_}x = \text{position\_smooth\_}x + \min\{(\text{position\_best\_}x - \text{position\_smooth\_}x)*0.2, \max\_x\_\text{speed}\} \quad (1)$$

$$\text{position\_smooth\_}y = \text{position\_smooth\_}y + \min\{(\text{position\_best\_}y - \text{position\_smooth\_}y)*0.2, \max\_y\_\text{speed}\} \quad (2)$$

$$\text{position\_smooth\_}z = \text{position\_smooth\_}z + \min\{(\text{position\_best\_}z - \text{position\_smooth\_}z)*0.2, \max\_z\_\text{speed}\} \quad (3)$$

where 0.2 indicates that the next position_best will be available five frames later and between two position_bests, the equations above smooth with five steps. In addition, the variable max_*_speed is applied as the maximum frame speed in order to avoid large position jumps for the user viewing the camera feed of the output content from the smoothing algorithm 234.

The neural networks 239 may include detectors that operate on images to compute, for example, face locations to model predicted locations of the face as the face moves in world space. Such networks 239 may be used to anchor particular 3D AR/MR content with respect to a moving user captured in a camera feed, for example. In some implementations, the neural networks 239 are not used by system 200. For example, system 200 may function to predict and place the 3D AR/MR content with respect to the moving user and with 6-DoF precision using a portion of system 230 to determine and smooth positions of facial features and using the 3-DoF tracking system 212.

The user interface system 206, and/or the 3-DoF tracking system 212, the face tracking system 230, and/or the control system 228 may include more, or fewer, devices, depending on a particular implementation, and each system 212, 228, and 230 may have a different physical arrangement than shown in FIG. 2. The mobile device 102 may also include one or more processors (e.g., CPU/GPU 240) in communication with the user interface system 206, the tracking systems 212 and 230, control system 228, memory 242, cameras 226, and a communication module 244. The communication module 244 may provide for communication between the mobile device 102 and other external devices. Processors 240 are configured to execute instructions (e.g., computer programs) in order to carry out specific tasks. In some implementations, at least one of the processors 240 executes instructions to identify a relative pose between the mobile device 102 and the face of a user accessing the mobile device 102 based on data determined from both the face tracking system 230 and the 3-DoF tracking system 212. Memory 242 may be utilized throughout communications and interactions amongst the elements in system 200.

In addition, mobile device 102 may use or have access to one or more VR/AR/MR peripherals 246. Example peripherals 246 may include any number of controllers, computing devices, head-mounted display devices, cameras, speakers, tracking systems, and/or other device in communication with mobile device 102.

In operation, a movement and/or pose change of the mobile device 102 can be detected by system 200 (or by mobile device 102 alone). The system 200 (or mobile device 102) can perform a number of calculations, determinations, and/or processes to determine and/or generate the pose and any change in pose as the mobile device 102 moves through 3D world space. The pose may be determined and/or generated using any number of algorithms described herein to track the mobile device 102 to properly move and render the content (camera image feed and AR/MR content) for display on mobile device 102 and/or on computing device 202 over network 204, for example. In some implementations, the pose and other content may be used and/or transmitted directly from the mobile device 102 without the use of the network 204. Similarly, portions of the pose (e.g., orientation or position) or other data may be transmitted from an external device to mobile device 102 without the use of network 204. In some implementations, the devices of system 200 may communicate using point-to-point communication mechanisms (e.g., BLE, USB, etc.).

Figure 3:
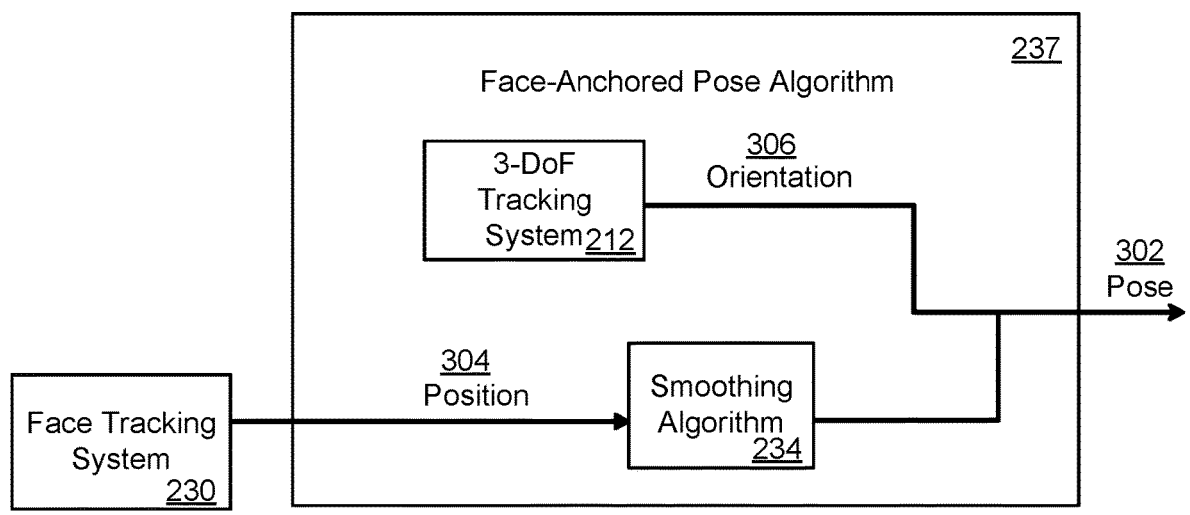
FIG. 3 is a block diagram of an example algorithm for performing face-anchored tracking, in accordance with implementations described herein.

FIG. 3 is a block diagram of an example algorithm for performing face-anchored tracking, in accordance with implementations described herein. The face-anchored tracking may invoke one or more pose algorithms 236 such as face-anchored pose algorithm 237 to generate a pose 302 for a particular electronic device (e.g., mobile device 102). The algorithm 237 may combine portions retrieved from the face tracking system 230 with portions retrieved from a 3-DoF tracking system 212.

For example, system 200 may obtain a position 304 from system 230 and may use one or more smoothing algorithms 234 to produce a smoothed positional output corresponding to detected user movements. In addition, the face-anchored pose algorithm 237 may use orientations 306 of the mobile device 102 obtained from 3-DoF tracking system 212. The pose algorithm 237 may execute as the mobile device 102 is moved in world space by the user operating a front-facing camera, such as camera 226. The pose 302 may be provided as output from algorithm 237 to be used to portray camera feed in real time and with smoothened output. For example, the position 304 may be smoothed by smoothing algorithms 234 to predict a net position for the device 102 (and/or user of the device) and to handle jitter and/or lag in updating video and/or image feed that may be caused by a traditional positional tracking system.

In some implementations, the predictions of positions of the device 102 and/or positions of the user operating the device 102 can be generated using the smoothing algorithms 234 to ensure that AR/MR content can be placed and moved with the user and can be depicted as such in an image feed provided to the user, as the user moves the device 102 in world space. To ensure proper placement of such content, the pose algorithm 237 can be used to track the AR/MR content (e.g., a virtual object) based on tracking of the facial features/image features associated with the user. Face-anchored pose algorithm 237 can perform such tracking without having to algorithmically assign a particular virtual object to follow the user.

FIG. 4A is a block diagram depicting an example of selecting an object of focus for performing pose tracking, in accordance with implementations described herein. A camera feed 402 (e.g., video feed, image feed, and/or virtual content within the feed, etc.) is shown depicting a first face 404 and a second face 406. In this example, the face cue detector 232 may function with the pose algorithms 236 to indicate to the system 200 which face (i.e., face 404 or face 406) to focus upon when determining 6-DoF poses from the images in the camera feed. In some implementations, the pose algorithms 236 may receive face cues and/or image features from another system other than face cue detector 232.

The first face 404 is shown with a plurality of image features (e.g., facial features (a)-(k)) in the image/camera feed 402. In addition, the second face 406 is depicted with image features (e.g., facial features (l)-(n)). Facial features (a)-(n) are merely examples of image features detectable by the system 200 and other image features/facial features may include other sizes and shapes and content that are not depicted here.

In this example, the pose algorithms 236 may be configured to select a largest face in the frame (of the image feed) to anchor upon for determining positions of the mobile device 102 with respect to any number of image features in the feed. As such, the algorithms 236 use the face 404 (and any selectable image features (a)-(k) associated with face 404) to anchor upon when determining changing positions of the mobile device 102. Anchoring on face 404 functions to select the world space as changing around face 404 (or a feature within face 404) while face 404 is represented as static (e.g., unmoving) in position calculations performed by system 200 and pose algorithms 236. In some implementations, the algorithms 236 may instead focus upon a smallest face, a nearest face, an upper, lower, or centered face. In the event that there are no faces detectable within the image feed, the pose algorithms 236 may be configured to continue to use a last known position of the mobile device 102 when determining which output to display in the display screen of the mobile device 102.

FIG. 4B is a block diagram depicting an example of selecting an object of focus for performing pose tracking, in accordance with implementations described herein. An image/camera feed 410 (e.g., video feed, image feed, and/or virtual content within the feed, etc.) is shown depicting a first face object 412 and a second face object 414. In this example, the face cue detector 232 may function with the pose algorithm 236 to indicate to the system 200 which face (i.e., face 412 or face 414) to focus upon when determining 6-DoF poses from the images in the camera feed. In some implementations, the pose algorithms 236 may receive face cues and/or or image features from another system other than face cue detector 232.

Although particular image features within feed 410 are not shown for simplification purposes, any number of image features may be represented and selectable by the system 200 as features in which to base calculations of position.

In this example, the face-anchored pose algorithm 236 may be configured to select one face of any number of faces to anchor upon when determining positions of the mobile device 102 with respect to any number of image features in the feed. In operation, the algorithms 236 selected virtual face object 414 to anchor (418) upon when determining changing positions of the mobile device 102. Anchoring on face 414 functions to select the world space as changing around face 414 (or a feature within face 414) while face 414 is represented as static (e.g., unmoving) in position calculations performed by system 200 and pose algorithms 236. In some implementations, the pose algorithms 236 may instead focus upon a smallest face, a nearest face, an upper, lower, or centered face based on any user or system setting for focusing on facial cues and/or image features.

FIG. 4C is a block diagram depicting an example of selecting an object of focus for performing pose tracking, in accordance with implementations described herein. A camera feed 420 (e.g., video feed, image feed, and/or virtual content within the feed, etc.) is shown depicting a first face object 422 and a second face object 424. In this example, the face cue detector 232 may function with the pose algorithms 236 to indicate to the system 200 which face (i.e., face 422 or face 424) to focus upon when determining 6-DoF poses from the images in the camera feed. In some implementations, the pose algorithms 236 may receive face cues and/or or image features from another system other than face cue detector 232.

Although particular image features within feed 420 are not shown for simplification purposes, any number of image features may be represented and selectable by the system 200 as features in which to base calculations of position.

In this example, the pose algorithms 236 may be configured to select to anchor on a centroid 426 of the faces. The centroid 426 between face 422 and face 424 is then used by system 200 as an anchor for determining positions of the mobile device 102 with respect to any number of image features (and faces) in the feed. In operation, the pose algorithms 236 selected the centroid 426 as the anchor for determining changing positions of the mobile device 102. Anchoring on centroid 426 functions to select the world space as changing around centroid 426 while the centroid 426 is represented as static (e.g., unmoving) in position calculations performed by system 200 and pose algorithms 236. In some implementations, the pose algorithms 236 may instead focus upon a centroid of a portion of the feed or other selectable area within the feed 420.

Figure 5:
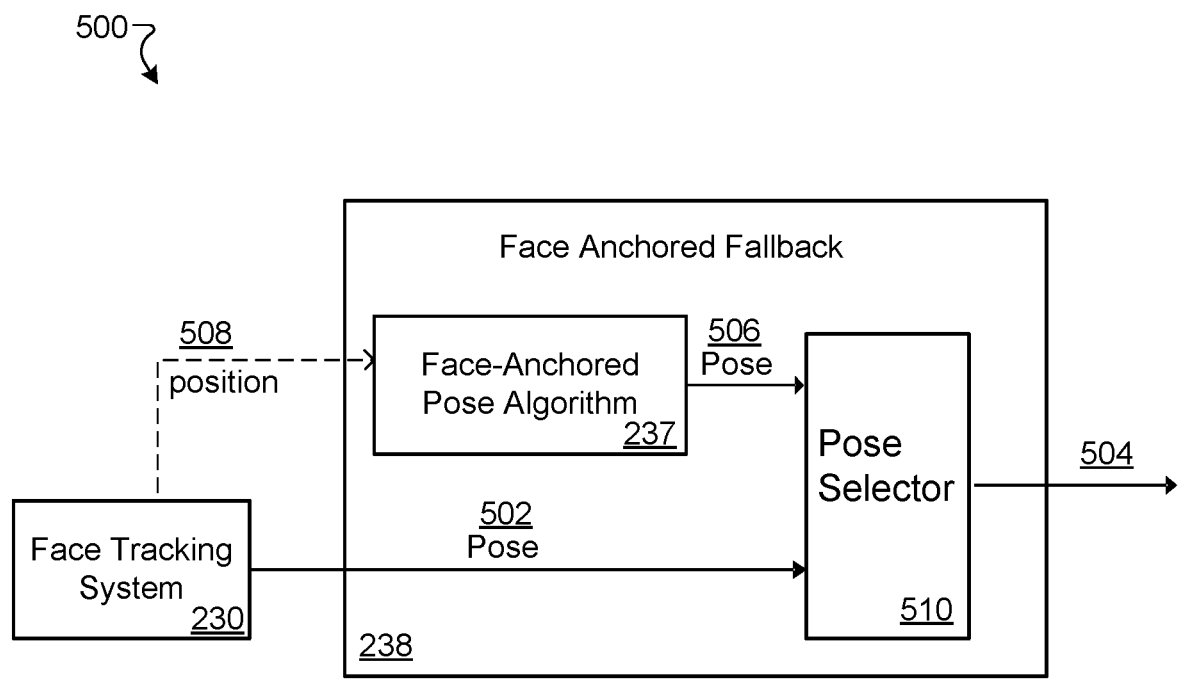
FIG. 5 is a block diagram depicting an example of selecting a pose for an electronic device, in accordance with implementations described herein.

FIG. 5 is a block diagram depicting an example of selecting a pose for an electronic device, in accordance with implementations described herein. The system 500 may be used as a fallback 6-DoF pose retrieval system if, for example, a 6-DoF pose tracking system fails or slows in performance (e.g., failures with face tracking system 230). For example, the system 500 may be used to select such a pose based on any or all of determined or detected system performance, network performance, and/or hardware performance. To determine whether or not to utilize the fallback 6-DoF pose from system 500, any number of confidence threshold levels may be set for the tracking systems that generate and/or select a pose for the electronic devices described herein (e.g., the mobile device 102) to ensure a particular system, network, or hardware device associated with the tracking may be assessed for a level of confidence associated with received data from or over the system, network, or hardware device.

As shown in FIG. 5, the face tracking system 230 may provide a 6-DoF pose 502 for the mobile device 102, but may fail, slow, or become otherwise unreliable at some point. A confidence threshold level may be predefined such that if the operation of system 230 becomes unreliable (e.g., falls below the predefined confidence threshold level), the system 200 (or 500) may select a different algorithm to provide the outputted pose 504. For example, the system 200 (or 500) may determine that the confidence threshold level is not met by system 230 and can instead obtain and/or determine a pose 506 from the face-anchored pose algorithm 237. Alternatively, the system 200 may request (e.g., query) both system 230 for the 6-DoF pose 502 and algorithm 237 for retrieving a position only (e.g., position 508) from system 230 and an orientation from algorithm 237 to obtain pose 506. The system 200 may then determine that the confidence threshold of the retrieved 6-DoF pose is not met by system 230 and may use a pose selector 510 to instead select pose 506 as output pose 504.

An example predefined confidence threshold (level) may represent a tracking metric indicating how confident particular image features are being tracked by the system 200, for example. In some implementations, the predefined confidence threshold is defined with a low, medium, or high status based on a percentage of image features being tracked correctly. For example, a low status for a confidence threshold may be less than 40 percent of the features are being tracked correctly. A medium status for a confidence threshold may be between 41 percent and 80 percent of the features are being tracked correctly. A high status for a confidence threshold may be between 81 percent and 100 percent of the features are being tracked correctly. Other scales may be used including weighting, averaging, and/or algorithmic determination of tracking confidence.

Similar to FIG. 3, the face-anchored pose algorithm 237 may also perform smoothing using one or more smoothing algorithms 234 (not shown here) on any retrieved position from system 230 to produce a smoothed positional output corresponding to detected user movements and/or mobile device 102 movements. As described above in FIG. 3, the face-anchored pose algorithm 237 may use orientations 306 of the mobile device 102 obtained from 3-DoF tracking system 212. The pose algorithm 237 may execute as the mobile device 102 is moved in world space by the user operating a front-facing camera, such as camera 226. In response, the pose 506 may be provided as output pose 504 to be used to portray camera feed in real time and with smoothened output.

In some implementations, predictions of positions of the device 102 and/or positions of the user (or user features) associated with operating the device 102 can be performed by the smoothing algorithms 234 to ensure that AR/MR content can be placed and moved with the user and can be depicted as such in an image feed provided to the user, as the user moves the device 102 in world space. To ensure proper placement of such content, the pose algorithm 237 can be used to track the AR/MR content (e.g., a virtual object) based on tracking of the facial features/image features associated with the user. Face-anchored pose algorithm 237 can perform such tracking without having to algorithmically assign a particular virtual object to follow the user.

In general, the face tracking system 230 may represent a first tracking system configured to generate a 6-DoF pose for the mobile device 102 corresponding to image features depicted in a camera feed displayed by the mobile device 102. For example, tracking system 230 may determine and use both a position and an orientation associated with image features (e.g., facial feature (a) in FIG. 4A) when device 102 is moved in world space. In particular, the 6-DoF pose may be generated by system 230 by determining an orientation for the mobile device 102 relative to facial feature (a) depicted in a video feed associated with device 102 [and relative to detected movements of facial feature (a)], for example. In addition, the system 230 may determine a position for the mobile device 102 relative to the facial feature (a) depicted in the video feed associated with device 102 [and relative to detected movements of facial feature (a)]. In some implementations, the position is calculated using the facial feature tracking algorithm (e.g., face-anchored pose algorithm 237) configured to detect three-dimensional location changes for at least one selected facial feature (e.g., facial feature (a)) amongst any number of the image features in the camera feed displayed by the mobile device 102. In general, the facial feature tracking algorithm may include the face-anchored pose algorithm, which may be configured to perform, upon detecting movement of the mobile device, a determination of an updated position of the mobile device relative to the at least one facial feature. The determination of the updated position of the mobile device may include performing periodic sampling of three dimensions of data of a plurality of images of the at least one facial feature to reduce jitter in the movement of the at least one facial feature upon triggering the updated camera feed for display on the mobile device 102, for example.

The mobile device 102 may also include a second tracking system including at least one inertial measurement unit (IMU) (e.g., IMU sensor 218 on 3-DoF tracking system 212). The IMU sensor 218 may detect and/or determine an orientation of the mobile device 102 in three-dimensional space. The system 500 may also utilize or include at least one processor coupled to memory and be configured to select either pose 506 or pose 502 as an output pose 504 for display in the camera feed of mobile device 102, as the device 102 (or the user operating device 102) moves in world space.

For example, the system 500 may trigger the first tracking system (e.g., system 230) to generate the 6-DoF pose for the electronic device if it is determined that the first tracking system operates within a predefined confidence threshold, as described above. In some implementations, determination of whether the first tracking system operates within the predefined confidence threshold may be triggered each time (or upon) detecting movement of the mobile device 102.

In some implementations, the system 500 may instead trigger the second tracking system (e.g., face anchored pose algorithm and 3-DoF tracking system 212) to generate an alternate 6-DoF pose 506 if the first tracking system (e.g., system 230) failed to operate within the predefined confidence threshold. The alternate 6-DoF pose 506 may be generated by combining the determined position 508 from the first tracking system (e.g., system 530) and the orientation of the second tracking system (e.g., using the IMU sensor 218 on 3-DoF tracking system 212).

The system 500 may trigger, for display on the mobile device 102, an updated camera feed depicting movement of the image features (e.g., the at least one facial feature) based on the 6-DoF pose 502 or the alternate 6-DoF pose 506 according to the determined operation of the first tracking system (e.g., face tracking system 230) with respect to the predefined confidence threshold level.

In some implementations, the system 500 may utilize and/or include at least one communication module 244 to trigger transmission of the 6-DoF pose 502 or the alternate 6-DoF pose 506 to display the image features on the mobile device based on a plurality of detected movements of the electronic device. In general, the 6-DoF pose 502 and the alternate 6-DoF pose 506 indicate a position of the mobile device 102 relative to the at least one selected facial feature.

Figure 6:
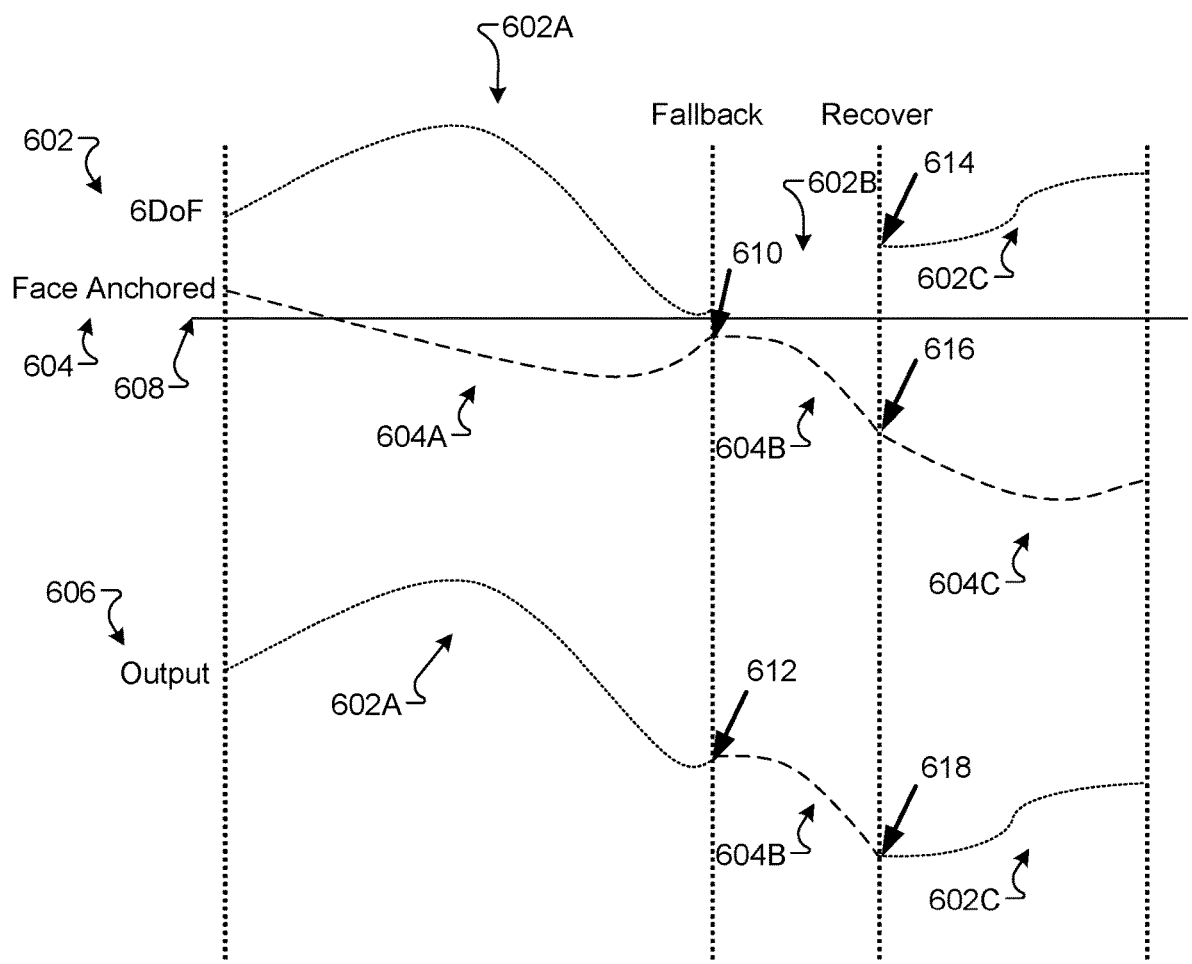
FIG. 6 is a graph depicting an example operation of the system of FIG. 5.

FIG. 6 is a graph depicting an example operation of the system of FIG. 5.

Example signals are shown indicating provision of a 6-DoF pose at particular times. For example, a 6-DoF pose signal 602 is shown in portions 602A, (missing 602B), and 602C. Similarly, a face-anchored algorithm-based pose signal 604 is shown in portions 604A, 604B, and 604C. An output pose signal 606 is shown including portions of signal 602 and 604 selected by system 500.

In operation of FIG. 5 (using system 500 and/or system 200), a 6-DoF pose signal 602 may be retrieved as mobile device 102 is moved in world space. Here, the signal 602A is shown to be strong and operating above a predefined threshold confidence level 608. At some point in time 610, the system 500 (and/or system 200) determine that the signal 602A falls below the threshold confidence level 608. In response, the system 500 can retrieve fallback 6-DoF pose data using the face-anchored tracking algorithm 237 and fallback pose algorithm 238, as described in detail above. The face anchored signal 604 illustrates the 6-DoF pose data from the face-anchored tracking algorithm 237 at time 610 and can select the signal 604B to be substituted into output pose signal 606, as shown at corresponding time 612. The signal 604B may be used to provide pose information to system 500 until the face anchored signal 604 is detected to be above the predefined threshold confidence level 608, as indicated at time 614, corresponding to time 616. The signal 602C can again be selected to provide the output pose signal 606, as shown by corresponding time 618. This fallback pose algorithm 238 can be used in a fallback and recover pattern while the user is operating and/or moving the mobile device 102. Each time a fallback and recover pattern occurs, the system 500 (and/or system 200) resets the world alignment with respect to particular image features and/or the mobile device 102.

Figure 7:
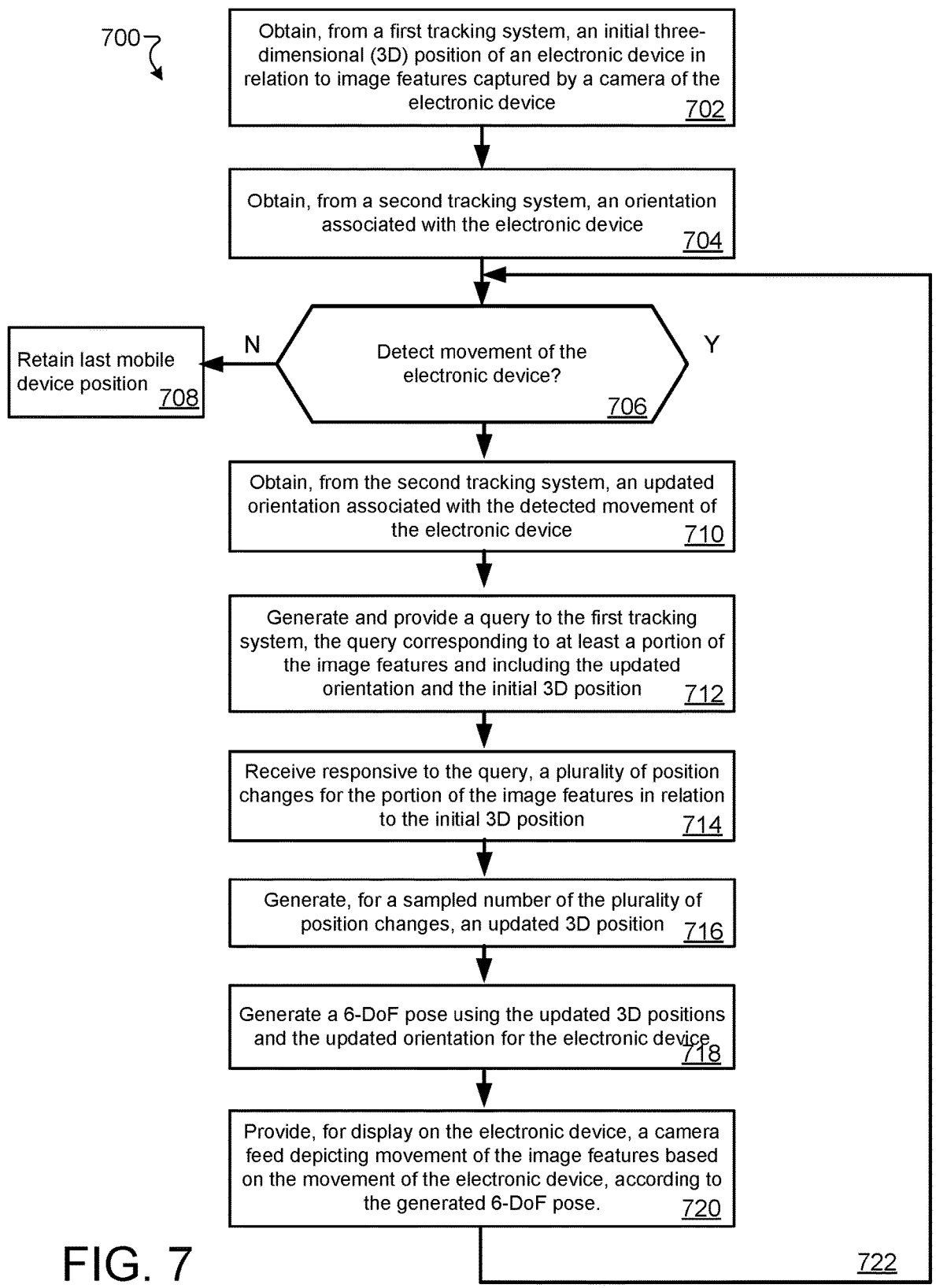
FIG. 7 is a flow chart diagramming an implementation of a process to determine a pose for an electronic device, in accordance with implementations described herein.

FIG. 7 is a flow chart diagramming an implementation of a process 700 to determine a pose for an electronic device, in accordance with implementations described herein. The process 700 is described with respect to an example implementation of the tracking system 200 of FIG. 2 and/or system 500 and may also describe details of FIGS. 1A-1B, but it will be appreciated that the method can be implemented by tracking systems having other configurations. In general, one or more processors and memory on the mobile device 102 may be used to carry out process 700.

At a high level, process 700 determines a rotation (e.g., position) and translation (e.g., orientation) of motion for a mobile device using two different tracking systems. The output of both systems is fused together to generate a pose for the mobile device with respect to one or more image features being captured by a camera associated with the device. The first tracking system may include a 3-DoF tracking system that is based on IMU measurements. The second tracking system may include a face tracking system that may determine relative position between face cues (e.g., facial features) and the camera. The system may provide the advantage of being a pose provider in a feature-less environment (i.e., blank or uniform background). In general, feature image points using image processing techniques is not used because the output of both tracking systems can provide pose generation and tracking without the feature image points.

At block 702, the process 700 may include obtaining, from a first tracking system, an initial three-dimensional (3D) position of an electronic device in relation to image features captured by a camera of the electronic device. The first tracking system may include the face tracking system 230. For example, a user may be operating the mobile device 102 and using the camera (e.g., a front facing camera) of the device 102. The mobile device may display an image feed (e.g., video feed) of the user. In some implementations, the first tracking system (e.g., face tracking system 230) executes a facial feature tracking algorithm (e.g., the face-anchored pose algorithm 237). In general, the face-anchored pose algorithm 237 is configured to determine 3D location changes for the image features associated with at least one selected facial feature in the image features. For example, the algorithm 237 may be configured to select a particular facial feature in which to anchor position tracking upon. Each new position may be based on the previously selected facial feature.

At some point, the user may move the mobile device 102, for example, while walking and capturing an image of the user. The device 102 can request and/or otherwise obtain a position for the mobile device 102. The position may be in relation to image features captured by the camera 226, for example. Such image features may include portions of a face of a user being captured by the camera 226 of the mobile device, 102, for example. In some implementations, the image features may also or instead include augmented reality content (e.g., virtual character 108) associated with the user being captured by the front facing camera (e.g., camera 226). In some implementations, the image features may also or instead include one or more facial features, background features, and/or virtual objects, and the like.

At block 704, the device 102 may request and/or otherwise obtain from a second tracking system, an orientation associated with the mobile device 102. The second tracking system may include the 3-DoF tracking system 212. In some implementations, the IMU sensor 218 may provide the orientation associated with the mobile device 102.

At block 706, the system 200 may detect whether or not the mobile device 102 has been moved. If the mobile device 102 has not been moved, the system 200 may continue tracking movement and providing pose information by retaining and using the last position known for mobile device 102, as shown at block 708.

If instead, the system 200 detects movement of the mobile device 102, the system 200 at block 710 may obtain or otherwise retrieve from the 3-DoF track in system 212, an updated orientation associated with the detected movement of the mobile device 102. The updated orientation may correspond to the change in movement of the mobile device 102. In some implementations, obtaining the updated orientation associated with the detected movement of the mobile device 102 from system 212 is performed in response to determining that the tracking system 230 is unable to provide both the position and orientation with 6-DoF. For example, if the system 200 determines that 6-DoF tracking on system 230 either fails or if circumstances of the image capture are suited to using portions of system 230 and system 212 to determine the poses for the mobile device 102. For example, the system 200 may determine that a background in the image capture occurring with camera 226 is feature-less (e.g., blank white, solid color, etc.). Such a background may make 6-DoF tracking with system 230 difficult because there are not background features in which to focus upon when determining position changes with respect to image features/facial features captured by the camera 226. The system 200 may also determine that a face (of the user using mobile device 102 and camera 226) is occupying a large percentage of the image feed. In such a case, tracking and displaying proper positioning of the movements of the face and any VR/AR/MR content may be difficult.

At block 712, the system 200 may then generate and provide a query to the tracking system 230 using communication module 244, for example. The query may correspond to at least a portion of the image features (e.g., facial features, virtual objects, etc.) and may include the updated orientation and the initial 3D position of the mobile device obtained at blocks 702 and 710, respectively.

At block 714, the system 200 may receive, responsive to the query, a plurality of position changes for the portion of the image features in relation to the initial 3D position of the mobile device 102. For example, system 230 may use face cue detector 232 and/or neural networks 239 to determine and/or predict movements for any number of moved image features in relation to the initial 3D position of the mobile device 102. In particular, the face tracking system 230 can use face cues (e.g., the image/facial) features to determine one or more relative (e.g., updated positions) between the face associated with the face cues and the camera 226.

At block 716, the system 200 may generate, for a sampled number of the plurality of position changes, an updated 3D position for the mobile device 102. For example, the system 200 may use face-anchored pose algorithm 237 and smoothing algorithms 234, as described in detail in the description of FIGS. 1-2 above. In some implementations, the updated 3D positions are generated using a periodic sampling of three dimensions of data for a plurality of image frames representing the position of the portion of the image features relative to the position of the mobile device 102. The periodic sampling may be performed using a threshold frame rate configured to reduce jitter in the movement of the portion of the image features depicted in the camera feed provided based on the generated 6-DoF pose.

For example, the smoothing algorithms 234 and/or pose algorithms 236 may perform filtering, frame sampling, and other signal smoothing operations to reduce jitter in moving users and/or to predict positions of the mobile device 102 with respect to a user that is moving.

At block 718, the system 200 may generate a 6-DoF pose using the updated 3D positions and the updated orientation for the mobile device. For example, the system 200 may combine an output from the face tracking system 230 and an output from the 3-DoF tracking system to enable tracking and placement of image content and AR content based on the generated 6-DoF pose, and responsive to the detected movement of the mobile device 102.

For example, the user 104A depicted in FIG. 2B may have moved (or moved the mobile device 102) to a different angle than shown in FIG. 1A. Character 108 is shown in an updated position (i.e., 108A moved in the direction of arrow 116), which corresponds to the user's movement (or mobile device movement). The system 200 may retrieve orientation information from the IMU sensor 218 associated with the mobile device 102, determine mobile device 102 position relative to the face of the user 104/104A using pose algorithms 236, smooth the determined mobile device 102 position using smoothing algorithms 234, and combine the smoothed position with the retrieved orientation to obtain updated poses (from FIG. 1A to FIG. 1B) to properly display user 104 and character 108 according to the updated poses.

At block 720, the system 200 may provide, for display on the mobile device 102, a camera feed depicting movement of the image features based on the movement of the electronic device, according to the generated 6-DoF pose from the combined outputs, for example. For example, movements that cause changes in position and orientation of the mobile device 102 (and/or a captured user and/or AR content) may be detected and used by the system 200 use the determined 6-DoF pose that is filtered and smoothed to generate a camera feed of the user and any AR content associated with the user as the mobile device 102 is moved and changes in position and orientation occur between the mobile device 102 and the face of the user operating the mobile device 102.

In some implementations, providing the camera feed depicting movement of the image features based on the movement of the mobile device 102 according to the 6-DoF pose includes providing placement of virtual objects associated with the user in the camera feed according to the 6-DoF pose each time the device 102 is moved.

The process 700 may also repeat certain steps in response to detecting additional movements associated with the mobile device. For example, at arrow 722, the system 200 may await additional movements of mobile device 102, at block 706. In response to detecting additional mobile device movements, the process 700 may repeat blocks 710-720 to obtain and display updated camera feed content based on an updated 6-DoF pose generated response to a newly detected movement.

Figure 8:
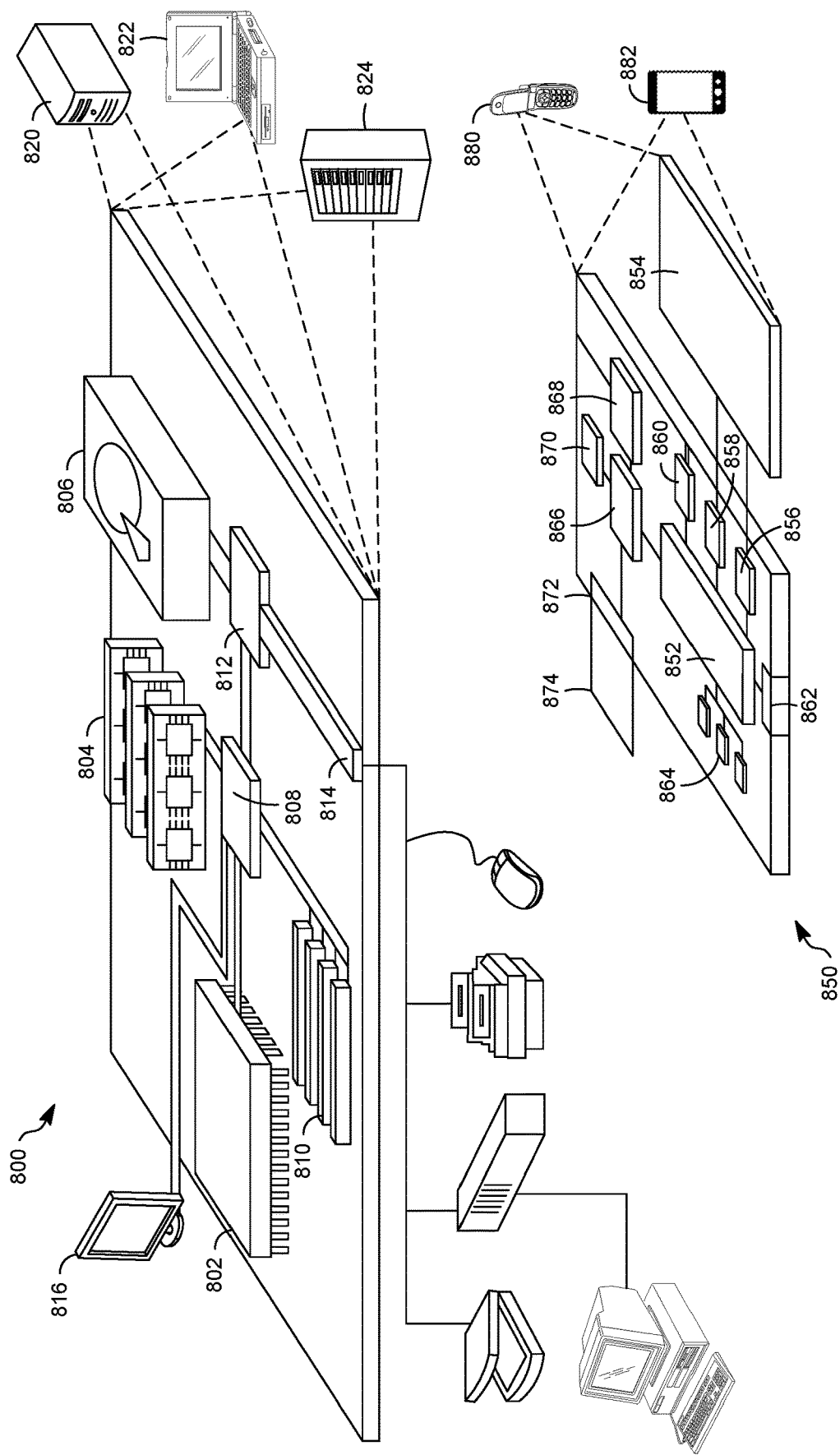
FIG. 8 illustrates an example of a computer device and a mobile computer device that can be used with the implementations described here.

FIG. 8 shows an example computer device 800 and an example mobile computer device 850, which may be used with the techniques described here. In general, the devices described herein can generate and/or provide any or all aspects of a virtual reality, an augmented reality, or a mixed reality environment. Features described with respect to the computer device 800 and/or mobile computer device 850 may be included in the portable computing device 100 described above. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device according to example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 80 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:
    receiving, from a first system, a position of a handheld electronic device in relation to at least one facial feature captured by a first camera of the handheld electronic device, the at least one facial feature being included in a face of a user holding the handheld electronic device;
    receiving, from a second system, an orientation associated with the handheld electronic device, the second system determining the orientation based on an image of a physical environment captured by a second camera;
    generating a six degree of freedom (6-DoF) pose using the position and the orientation;
    triggering for display, on the handheld electronic device, a camera feed depicting movement of the at least one facial feature according to the generated 6-DoF pose; and
    providing pose information of a virtual object based on the generated 6-DoF pose.

2. The computer-implemented method of claim 1, further comprising:
    obtaining, from the second system, an updated orientation associated with a detected movement of the handheld electronic device,
    wherein generating the 6-DoF pose comprises generating the 6-DoF pose using the position and the updated orientation.

3. The computer-implemented method of claim 1, further comprising:
    determining an updated position for the at least one facial feature by determining three-dimensional location changes for the at least one facial feature according to a detected movement of the handheld electronic device from an initial position of the handheld electronic device,
    wherein generating the 6-DoF pose includes determining the 6-DoF pose using the updated position and the orientation.

4. The computer-implemented method of claim 1, further comprising:
    calculating a smoothed position based on the position using a smoothing algorithm,
    wherein generating the 6-DoF pose comprises generating the 6-DoF pose using the smoothed position and the orientation.

5. The computer-implemented method of claim 1, wherein the generated 6-DoF pose is a last-generated 6-DoF pose.

6. The computer-implemented method of claim 1, further comprising:
    detecting that the handheld electronic device has not moved,
    wherein the providing pose information is performed in response to detecting that the handheld electronic device has not moved.

7. The computer-implemented method of claim 1, wherein:
    the face is a first face;
    the camera captures the first face and a second face, the first face being larger than the second face; and
    the method further includes the first system determining the position of the handheld electronic device in relation to the at least one facial feature included in the first face based on the first face being larger than the second face.

8. The computer-implemented method of claim 1, wherein the orientation associated with the handheld electronic device is determined by the second system based on inertial measurement data obtained by the handheld electronic device.

9. The computer-implemented method of claim 1, further comprising placing augmented reality content in an image feed provided to the user based on the pose information of the face of the user.

10. The computer-implemented method of claim 1, wherein the pose information of the virtual object includes a position of the virtual object and an orientation of the virtual object.

11. A non-transitory computer program product comprising instructions stored thereon that, when executed by at least one processor, are configured to cause a computing device to:
    receive, from a first system, a position of a handheld electronic device in relation to at least one facial feature captured by a first camera of the handheld electronic device, the at least one facial feature being included in a face of a user holding the handheld electronic device;
    receive, from a second system, an orientation associated with the handheld electronic device, the second system determining the orientation based on an image of a physical environment captured by a second camera;
    generate a six degree of freedom (6-DoF) pose using the position and the orientation;
    trigger for display, on the handheld electronic device, a camera feed depicting movement of the at least one facial feature according to the generated 6-DoF pose; and
    provide pose information of a virtual object based on the generated 6-DoF pose.

12. The non-transitory computer program product of claim 11, wherein the instructions are further configured to cause the computing device to:
    obtain, from the second system, an updated orientation associated with a detected movement of the handheld electronic device,
    wherein generating the 6-DoF pose comprises generating the 6-DoF pose using the position and the updated orientation.

13. The non-transitory computer program product of claim 11, wherein the instructions are further configured to cause the computing device to:
  determine an updated position for the at least one facial feature by determining three-dimensional location changes for the at least one facial feature according to a detected movement of the handheld electronic device from an initial position of the handheld electronic device,
  wherein generating the 6-DoF pose includes determining the 6-DoF pose using the updated position and the orientation.

14. The non-transitory computer program product of claim 11, wherein the instructions are further configured to cause the computing device to:
  calculate a smoothed position based on the position using a smoothing algorithm,
  wherein generating the 6-DoF pose comprises generating the 6-DoF pose using the smoothed position and the orientation.

15. The non-transitory computer program product of claim 11, wherein the instructions are further configured to cause the computing device to:
  detect that the handheld device has not moved,
  wherein the providing pose information is performed in response to the detection that the handheld device has not moved.

16. The non-transitory computer program product of claim 11, wherein:
  the face is a first face;
  the camera captures the first face and a second face, the first face being larger than the second face; and
  the instructions are further configured to cause the first system to determine the position of the handheld electronic device in relation to the at least one facial feature included in the first face based on the first face being larger than the second face.

17. The non-transitory computer program product of claim 11, wherein the orientation associated with the handheld electronic device is an orientation of the handheld electronic device relative to the facial feature.

18. A computing device comprising:
  at least one processor; and
  a non-transitory computer program product comprising instructions stored thereon that, when executed by the at least one processor, are configured to cause the computing device to:
    receive, from a first system, a position of a handheld electronic device in relation to at least one facial feature captured by a first camera of the handheld electronic device, the at least one facial feature being included in a face of a user holding the handheld electronic device;
    receive, from a second system, an orientation associated with the handheld electronic device, the second system determining the orientation based on an image of a physical environment captured by a second camera;
    generate a six degree of freedom (6-DoF) pose using the position and the orientation;
    trigger for display, on the handheld electronic device, a camera feed depicting movement of the at least one facial feature according to the generated 6-DoF pose; and
    provide pose information of a virtual object based on the generated 6-DoF pose.

19. The computing device of claim 18, wherein:
  the face is a first face;
  the camera captures the first face and a second face, the first face being larger than the second face; and
  the instructions are further configured to cause the first system to determine the position of the handheld electronic device in relation to the at least one facial feature included in the first face based on the first face being larger than the second face.

20. The computing device of claim 18, wherein the instructions are further configured to cause the computing device to:
  detect that the handheld electronic device has not moved,
  the providing pose information being performed in response to detecting that the handheld electronic device has not moved.

* * * * *